No. 830,386. PATENTED SEPT. 4, 1906.
J. T. H. WARWOOD.
KILN FOR BURNING CLAY PRODUCTS.
APPLICATION FILED APR. 2, 1906.
5 SHEETS—SHEET 1.
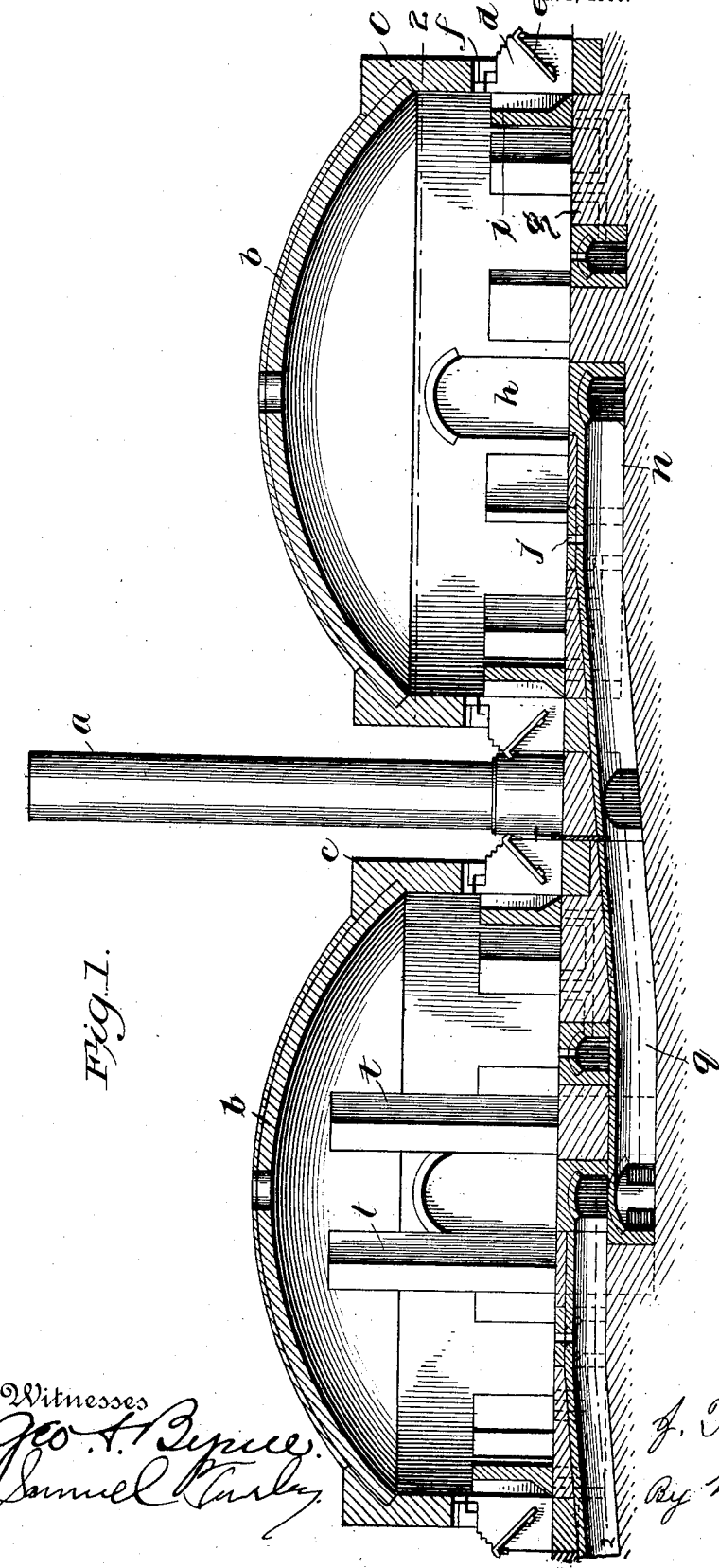

No. 830,386. PATENTED SEPT. 4, 1906.
J. T. H. WARWOOD.
KILN FOR BURNING CLAY PRODUCTS.
APPLICATION FILED APR. 2, 1906.
5 SHEETS—SHEET 2.
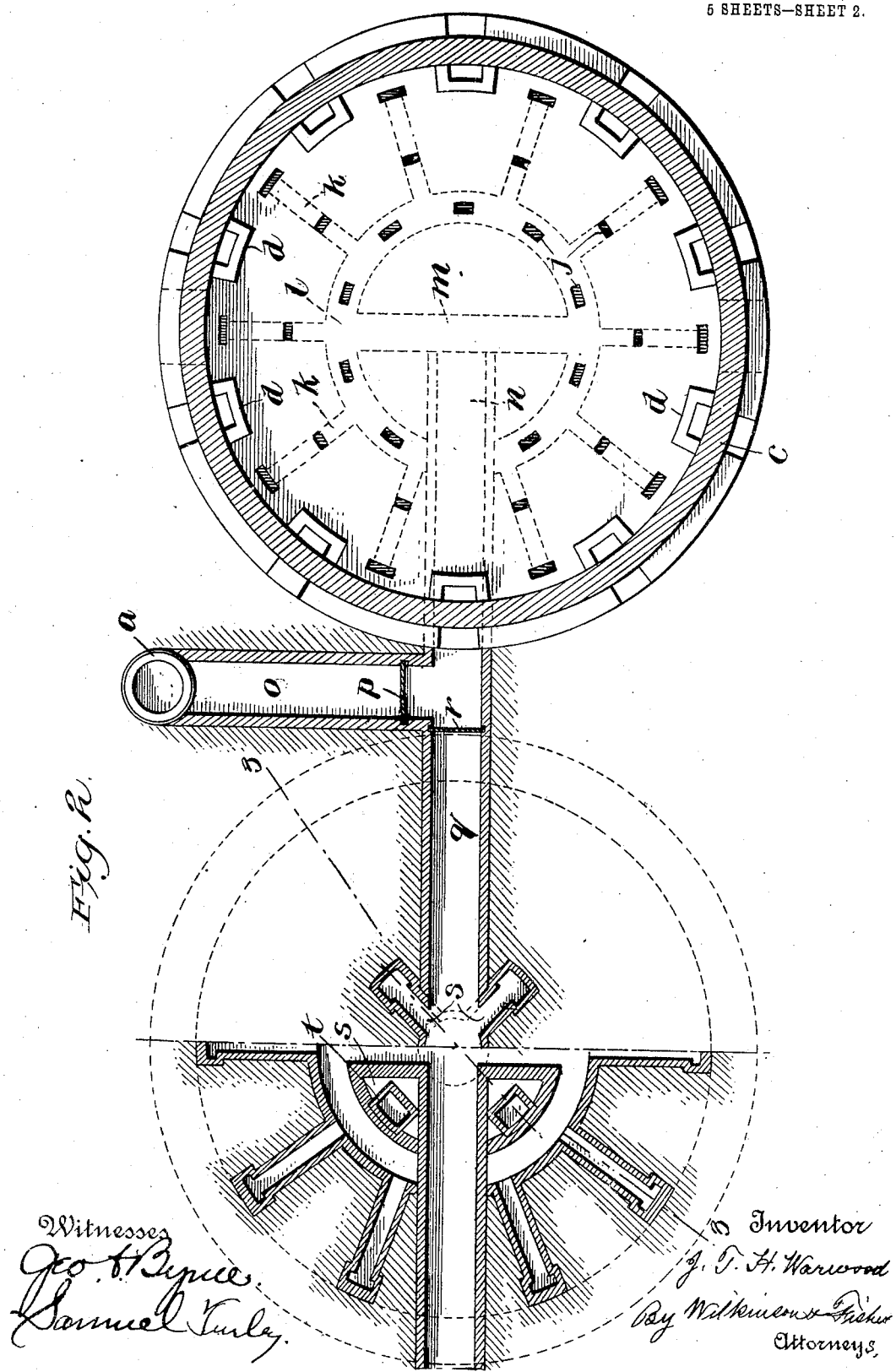

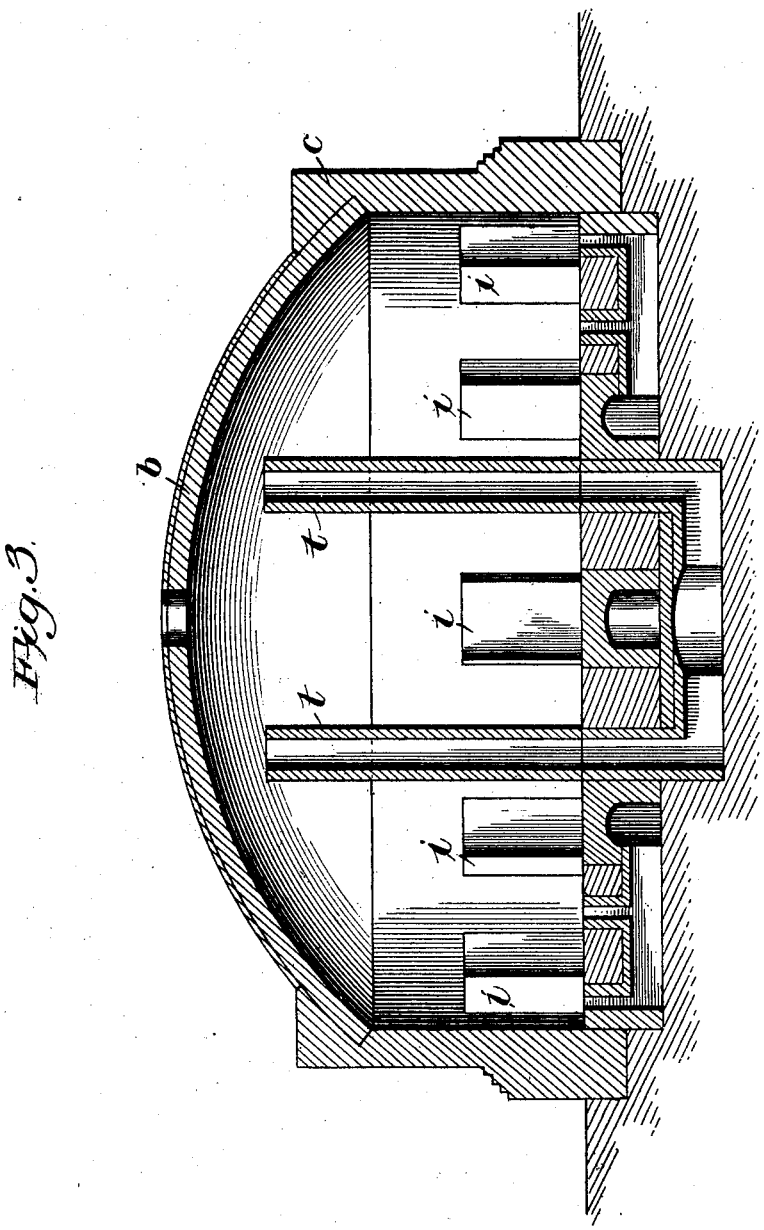

No. 830,386. PATENTED SEPT. 4, 1906.
J. T. H. WARWOOD.
KILN FOR BURNING CLAY PRODUCTS.
APPLICATION FILED APR. 2, 1906.
5 SHEETS—SHEET 4.
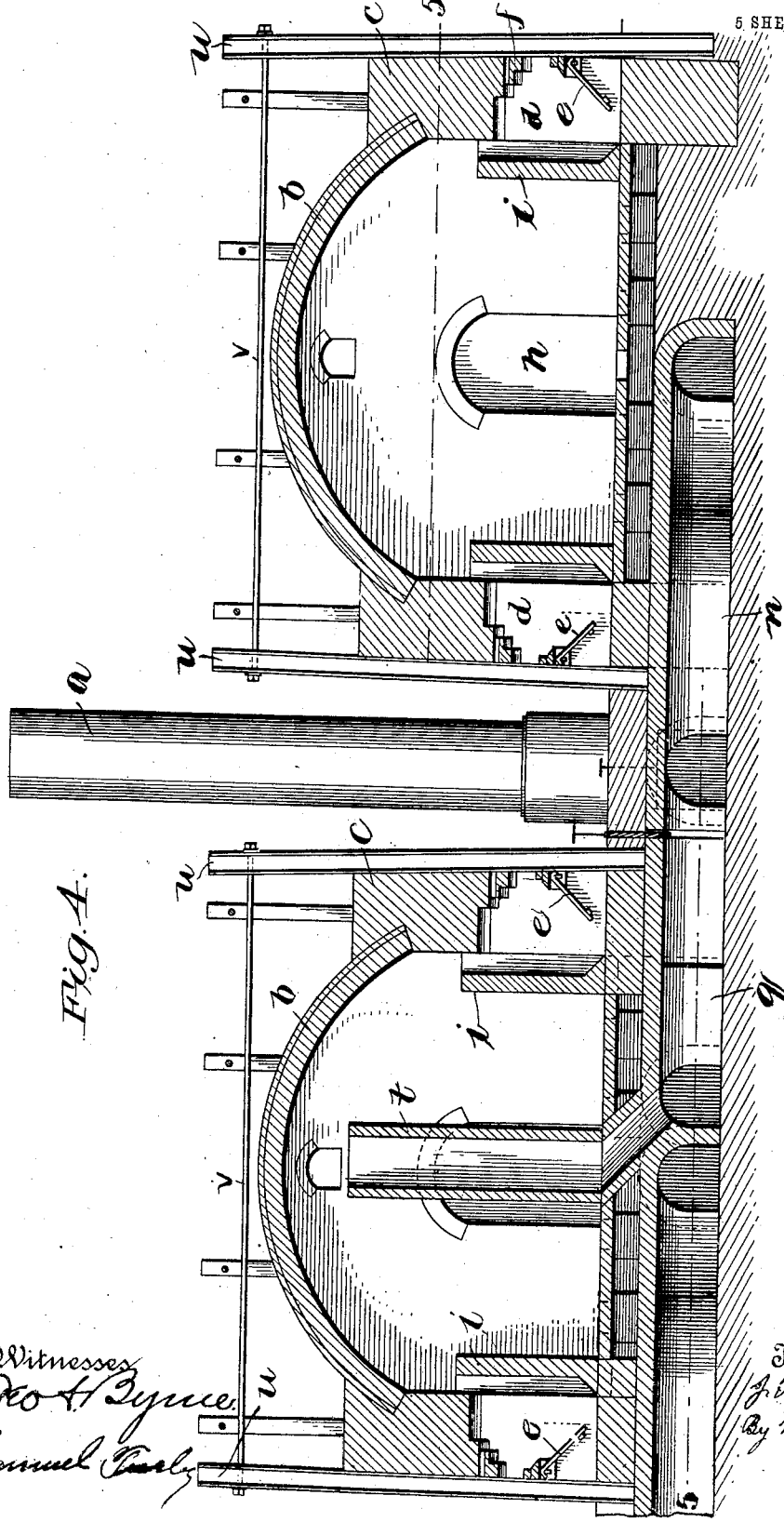

No. 830,386. PATENTED SEPT. 4, 1906.
J. T. H. WARWOOD.
KILN FOR BURNING CLAY PRODUCTS.
APPLICATION FILED APR. 2, 1906.
5 SHEETS—SHEET 5.
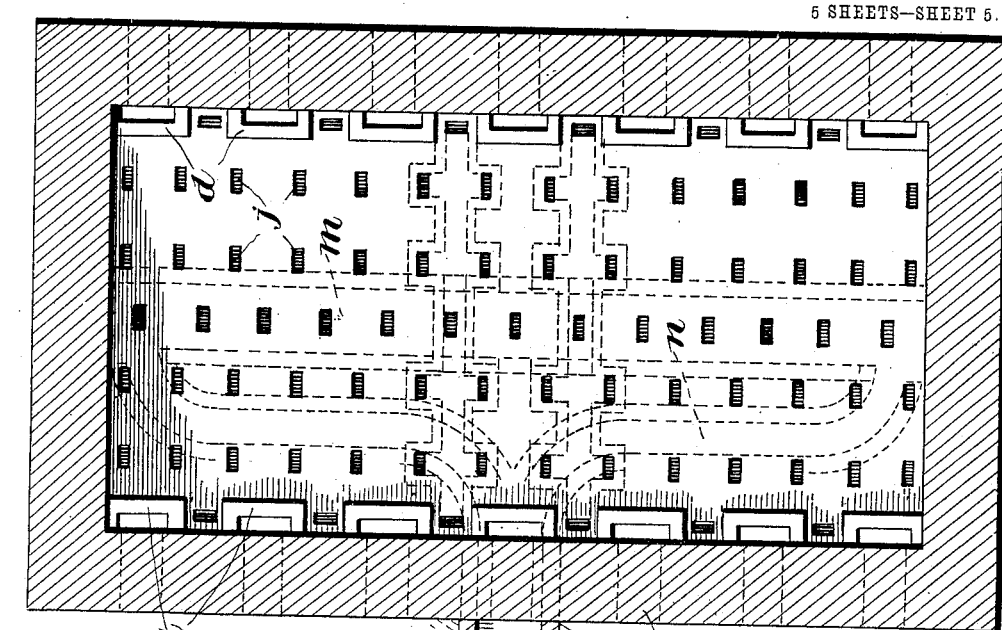
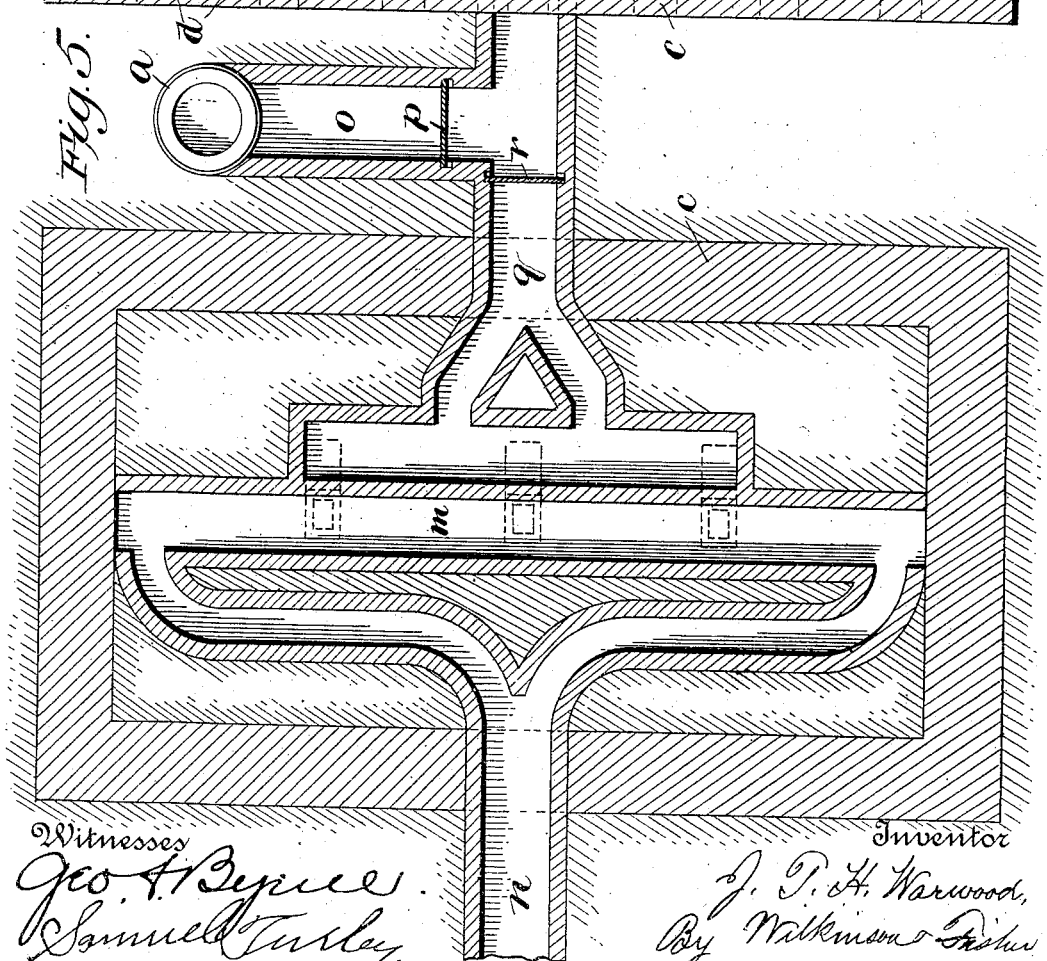

UNITED STATES PATENT OFFICE.

JOSEPH T. H. WARWOOD, OF AUGUSTA, GEORGIA, ASSIGNOR OF ONE-HALF TO JOB L. HANKINSON, OF AUGUSTA, GEORGIA.

KILN FOR BURNING CLAY PRODUCTS.

No. 830,386.      Specification of Letters Patent.      Patented Sept. 4, 1906.

Application filed April 2, 1906. Serial No. 309,434.

*To all whom it may concern:*

Be it known that I, JOSEPH T. H. WARWOOD, a citizen of the United States, residing at Augusta, in the county of Richmond and State of Georgia, have invented certain new and useful Improvements in Kilns for Burning Clay Products; and I do hereby declare the following to be a full, clear, and exact description of the invention, such as will enable others skilled in the art to which it appertains to make and use the same.

My invention relates to improvements in kilns for burning clay products; and the object of my invention is to make a kiln of any desired size or shape which may be used either separately in or connection with other kilns to make use of the waste gases drawn therefrom.

With this object in view my invention consists in the constructions and combinations of parts, as hereinafter described and claimed.

In the accompanying drawings, Figure 1 is a vertical central section of two kilns connected together in accordance with my invention. Fig. 2 is a cross-section on the broken line 2 2 of Fig. 1. Fig. 3 is a cross-section on the line 3 3 of Fig. 2. Fig. 4 is a cross-section of a different style of kiln, but constructed according to my invention; and Fig. 5 is a cross-section on the line 5 5 of Fig. 4.

$a$ represents the chimney or stack, which may be located in the center of a group of kilns or in any convenient place.

In Fig. 1 two circular kilns are shown, these being merely two of a series, of which any number may be used. $b$ represents the top of the kilns, and $c$ the sides, all of the kilns shown being downdraft-kilns. $d$ represents the fire-boxes provided with grates $e$, of which any number may be used arranged around the circumference of the kiln. $f$ represents the flues delivering to the upper part of each of the fire-boxes. The interior of the kiln above the floor $g$ is practically unencumbered for the reception of articles to be heated, and $h$ represents the removable doors through which the articles to be heated are introduced into the kiln before the same is fired up. The back part of the fireplaces is provided with a wall $i$, which causes the products of combustion to be thrown up toward the top of the kiln over the material to be treated, from whence the products of combustion pass downward through the material to be treated and out through the holes $j$ in the floor of the kiln. These holes are preferably located in concentric circles. The outer rows of circles communicate with the radial passages $k$, which in turn communicate with a circular passage $l$, with which the inner row of holes also communicates. The circular passage $l$ communicates with a cross-passage $m$, which in turn communicates with the large delivery-passage $n$, leading out of the kiln and connecting with the passage $o$, leading to the stack $a$, which passage may be shut off by a valve $p$. The passage $n$ also communicates with a passage $q$ underneath the next kiln, and a valve $r$ is used to close this passage when desired. By means of the valves $p$ and $r$ the waste gases after passing through the kilns may be either led directly into the stack or caused to pass into a second kiln through the passage $q$. The passage $q$ communicates directly with receiving-chamber, (not lettered,) thence to the passages $s$, which pass through the floor of the second kiln and which deliver into the flues $t$ in said kiln, causing the gases to be thrown up to any desired height of said kiln, whence they descend through the material set in the succeeding kilns. These flues $t$ are removable and may be used in connection with receiving-chamber, circular or straight flues, and this is one of the important features of my invention, since by the use of the removable flues the gases may be distributed from the burning-kiln through the succeeding kilns from any desired point; but in all cases the draft through the kiln is downward. Except as above described, all kilns are substantially the same as the first kiln already described. Indeed, a number of kilns may be used arranged to connect with a central stack, if desired, each kiln having one passage communicating with the stack and the other passages communicating with the adjacent kilns. By the arrangement described each kiln may be used by itself or in conjunction with the other kilns, as described.

In Figs. 4 and 5 rectangular kilns are shown instead of circular kilns. These are in their main features the same as have already been described, but I prefer to use bracing-bars, such as $u$, united by rods, such as $v$.

The operation of the kilns, whether rectangular or circular, is practically the same; but of course the passages are differently shaped, as shown in Fig. 5, being arranged in substantially straight lines instead of in circles.

Having thus described my invention, what I claim as new, and desire to secure by Letters Patent, is—

1. The combination of two or more downdraft-kilns, each provided with a series of openings in its floor, and with a series of fireplaces, of removable flues adapted to be inserted in said kilns, and a valved channel connecting said flues with the preceding kiln, substantially as described.

2. The combination of a series of kilns, each having a series of openings in its floor, a valved channel connecting each of said kilns with the preceding kiln, a stack, a valved channel connecting each of said kilns with said stack, and a series of removable flues adapted to be inserted in each of said kilns and to register with some of the openings in the floor thereof, substantially as described.

3. The combination of a series of downdraft circular or square kilns, each kiln being provided with a series of fireplaces and a series of openings through the floor located in concentric circles or straight lines as heretofore described, a valved channel connecting each of said kilns with the preceding kiln, a stack, a valved channel connecting each of said kilns with said stack, the lower part of each of said kilns being provided with a series of passages leading into the main passage connecting said kiln to the succeeding kiln, and a series of removable flues adapted to be placed in any or all of said kilns and to register with some of the openings in the floors thereof, substantially as described.

In testimony whereof I affix my signature in presence of two witnesses.

JOSEPH T. H. WARWOOD.

Witnesses:
R. SHOPON,
GEO. A. SHERMAN.